United States Patent
Kumar et al.

(10) Patent No.: US 11,538,084 B2
(45) Date of Patent: Dec. 27, 2022

(54) METHOD AND MEDIUM FOR CUSTOMER PRODUCT RECOMMENDATIONS

(71) Applicant: Hewlett Packard Enterprise Development LP, Houston, TX (US)

(72) Inventors: Pankaj Kumar, Bangalore (IN); Aswinraj Govindaraj, Bangalore (IN); Xin Zhang, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 601 days.

(21) Appl. No.: 16/220,345

(22) Filed: Dec. 14, 2018

(65) Prior Publication Data
US 2020/0193501 A1 Jun. 18, 2020

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0253* (2013.01); *G06Q 30/0255* (2013.01)

(58) Field of Classification Search
CPC .......... G06Q 30/0631; G06Q 30/0253; G06Q 30/0255
See application file for complete search history.

(56) References Cited

U.S. PATENT DOCUMENTS

| | | | |
|---|---|---|---|
| 6,317,722 B1 | 11/2001 | Jacobi et al. | |
| 7,827,305 B2 | 11/2010 | Zhang et al. | |
| 8,180,688 B1 * | 5/2012 | Velummylum | G06Q 30/0282 705/26.7 |
| 10,861,077 B1 * | 12/2020 | Liu | G06Q 30/0631 |
| 2002/0019763 A1 * | 2/2002 | Linden | G06Q 30/0254 705/14.53 |

(Continued)

FOREIGN PATENT DOCUMENTS

CN 103093369 5/2013

OTHER PUBLICATIONS

Sharma, Amit, Jake M. Hofman, and Duncan J. Watts. "Estimating the causal impact of recommendation systems from observational data." Proceedings of the Sixteenth ACM Conference on Economics and Computation. (Year: 2015).*

(Continued)

*Primary Examiner* — Matthew E Zimmerman
(74) *Attorney, Agent, or Firm* — Sheppard Mullin Richter & Hampton LLP

(57) ABSTRACT

Examples described herein relate to a system consistent with the disclosure. For instance, the system may comprise a data lake including information relating to an in-store activity of a customer and an online activity of the customer, a processing resource, and a non-transitory machine-readable medium storing instructions executable by the processing resource to identify the in-store activity and the online activity of the customer, aggregate and store the in-store activity and the online activity of the customer in the data lake, reduce an amount of products in a product portfolio, compare purchases including in-store purchases and online purchases, and recommend a product of the plurality of products based on the comparison.

13 Claims, 7 Drawing Sheets

(56) References Cited

U.S. PATENT DOCUMENTS

| | | | | |
|---|---|---|---|---|
| 2005/0192870 A1* | 9/2005 | Geddes | ................... | G06N 5/04 |
| | | | | 705/26.8 |
| 2006/0235779 A1 | 10/2006 | Drew et al. | | |
| 2008/0249865 A1* | 10/2008 | Angell | ............... | G06Q 30/0277 |
| | | | | 705/14.51 |
| 2011/0191157 A1* | 8/2011 | Blackhurst | ......... | G06Q 30/0224 |
| | | | | 705/14.25 |
| 2011/0264526 A1* | 10/2011 | Mital | ................ | G06Q 30/0603 |
| | | | | 707/706 |
| 2015/0051979 A1 | 2/2015 | Knab et al. | | |
| 2015/0088692 A1* | 3/2015 | Fung | ................. | G06Q 30/0623 |
| | | | | 705/26.61 |
| 2015/0206224 A1* | 7/2015 | Ouimet | ............. | G06Q 30/0251 |
| | | | | 705/26.7 |
| 2017/0111461 A1 | 4/2017 | Kelman et al. | | |

OTHER PUBLICATIONS

Abdullah, N., Integrating Collaborative Filtering and Search-based Techniques for Personalized Online Product Recommendation, (Research Paper), Dec. 11, 2011, 3 Pgs.

Ward, J. et al., HP Transforms Product Portfolio Management with Operations Research, (Research Paper), Jun. 6, 2010, 37 Pgs.

Michael Hahsler., "recommenderlab: A Framework for Developing and Testing Recommendation Algorithms", 2017, 40 pages.

\* cited by examiner

METHOD AND MEDIUM FOR CUSTOMER PRODUCT RECOMMENDATIONS

BACKGROUND

In terms of product sales in business-to-business (B2B) ecommerce, product providers may use a recommendation engine to generate and recommend products based on an input. For example, the recommendation engine may identify products with behavior attributes of a customer. Recommendation engines may receive a vast amount of input before making a recommendation.

DETAILED DESCRIPTION

Systems may provide product recommendations to a customer based on purchases and/or interest of the customer. Product recommendations may be provided to the customer as the customer purchases products. The system may make recommendations with input from a company product portfolio. As used herein, "product portfolio" refers to a catalog of products offered for sale by a company.

However, the product portfolio may include a vast amount of products. A product portfolio including a vast amount of products may cause the recommendation of redundant products. For example, the same and/or similar product may be recommended to the customer multiple times or at the same time. Further, the including a vast amount of products may cause missed opportunities. That is, due to the amount of products in the product database the system may not be able to recommend products that are useful and/or helpful to the customer. Including a vast product portfolio may prevent the system from creating a personalized user experience for the customer.

Accordingly, customer product recommendations, as described herein, may cause a processing resource to identify in-store activity and the online activity of a customer, aggregate the activity of the customer, and reduce the amount of products in the product portfolio by comparing product activity of customers. That is, products may be recommended to a customer based on the product activity of the customer and other customers, as detailed herein.

In some examples, the system may utilize a data lake to aggregate the data of a customer and analyzes the purchases and activities of the customer. As used herein, "customer" refers to a person and/or entity with a data lake. The data from the data lake may then be used to determine which products are purchased together and/or are interdependent to each other. This may allow the system to predict which related and/or additional products a customer is likely to purchase based on the product activity of the customer. As used herein, "product activity" refers to the act of a customer viewing, saving, liking, showing interest in, and/or purchasing a product.

Further, the system may recommend the related products, based on the product activity of a customer. Recommending relevant products to the customer may lead to a sale of an upgraded product and/or the sale of related products. The recommendations are made based on the similarities between the related product and the interest products in the data lake, similarities between the products purchased by other customers, and the intent of the customer and other customers. Recommending products based on the aggregation of customer data may provide the customer with specific products that are tailored to their goals.

Figure 1:
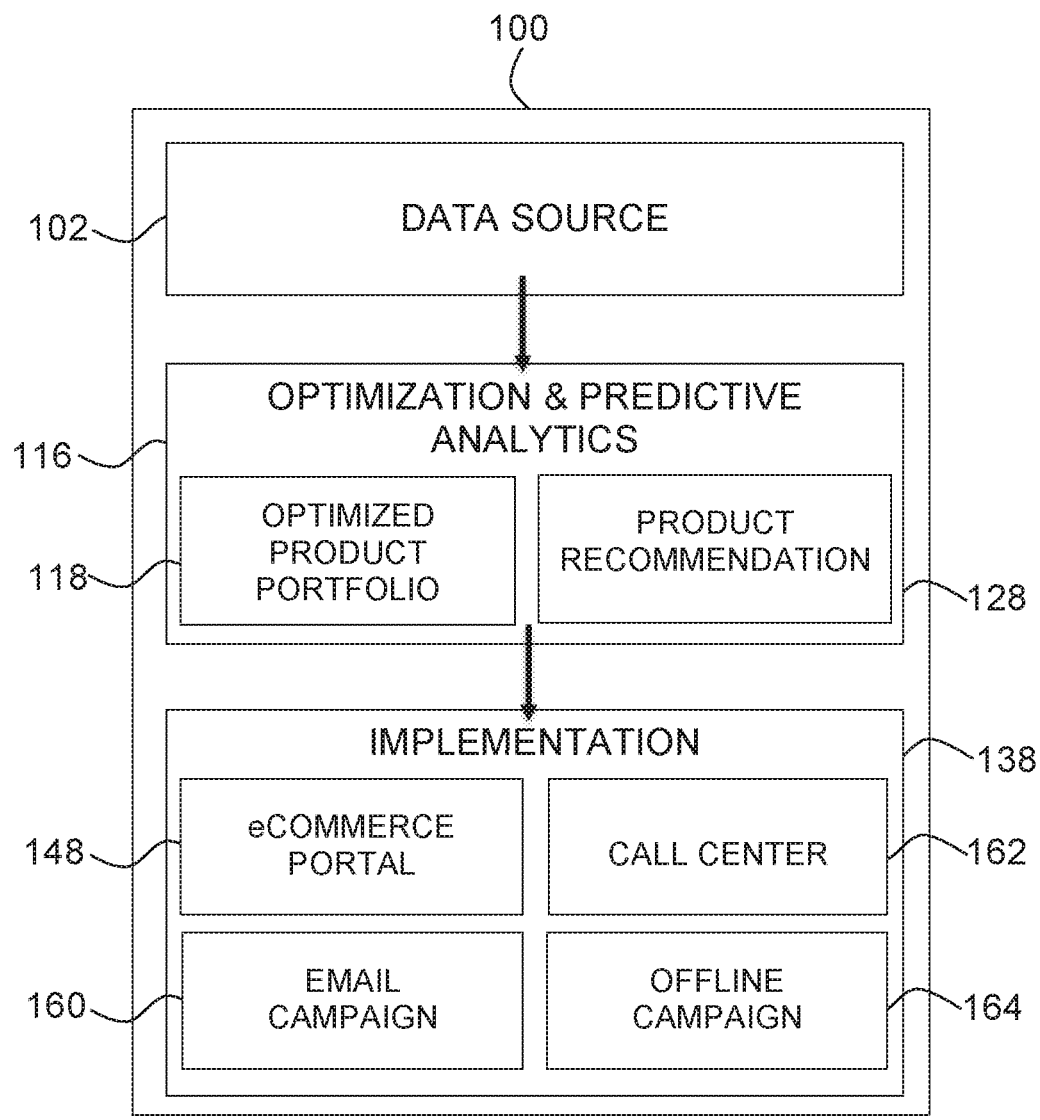
FIG. 1 illustrates an example of a system including a data lake consistent with the disclosure.

FIG. 1 illustrates an example of a system 100 including a data lake 102 consistent with the disclosure. The data lake 102 may include information relating to in-store activity of a customer and online activity of a customer. That is, the system 100 may store the product activity of a customer in the data lake 102. The system 100 may be able to monitor and store in the data lake 102 which interest products the customer installs, when the customer calls the call center or customer support and/or which interest products the customer discuss when calling the call center or customer support, specific transactions performed by the customer, the product category the customer purchases from, etc. As used herein, "interest products" refers to a product or products associated with the data lake of a customer and/or a product or products viewed, saved, liked, and/or purchased by a customer.

In addition, the system 100 may identify the product interactions of a customer and store the data in the data lake 102. For example, if a customer shows interest in a product on a third-party website, a product menu, or in a physical store, the system 100 may identify the customer and store the interactions and/or activity of the customer in the data lake 102. For instance, the system 100 may be able to identify a customer based on the internet protocol (IP) address of a customer and store the interest products viewed by the customer in the data lake 102. The system 100 may be able to monitor the products the customer is interested in and store the data in the data lake 102. For example, the system 100 may determine that the customer purchases products under a certain price point and store the information in the data lake 102. The system 100 may then recommend products within the price point of the customer. As used herein, "data lake" refers to a centralized place that contains data of a customer's interest and product interactions both in-store and online customer.

In some examples, the data lake 102 may store products purchased from an online store. Similarly, the data lake 102 may store products purchased in-store. As used herein, "in-store" refers to a physical store and/or a store that is not accessed by a computing device. As used herein, "online store" refers to a store that is accessed by a computing device. In some examples, the optimization and predictive analytics layer 116 may utilize the information from the data lake 102 to produce an optimized product portfolio 118. The optimized product portfolio 118 may include a plurality of interdependent products. The analytics layer 116 may use the data lake 102 of each customer to analyze product interest of customers and shape the demand of the product portfolio. That is, the analytics layer 116 may use the data lake 102 of each customer to determine which products a customer is most likely to purchase. As such, determining which products a customer is most likely to purchase may allow the analytics layer 116 to limit the products offered in the product portfolio while maintaining the revenue produced from the products offered.

In some examples, limiting the products offered may reduce the product portfolio from a range of about 100,000 products offered to about 20,000 products offered, including all individual values and subranges between. Reducing the product portfolio may produce an optimized product portfolio 118 and save resource by reducing the amount of maintenance used to maintain the product portfolio. Further, reducing the product portfolio may cause the product menu to load the products faster, as compared to a product portfolio with 100,000 products offered. In some examples, limiting the products offered in the product portfolio may allow the offering of efficient products that are useful to the customer at a better and/or cheaper cost, as compared to the cost of a product when 50,000 or more products are offered. Further, limiting the products offered to a customer may limit the number of rule sets (e.g., possible recommendations). That is, a decreasing the number of products offered may decrease the amount of possible recommendations to offer a customer and ensure that the customer receives useful recommendation to accomplish the goals of the customer.

In some examples, the optimization and predictive analytics layer 116 may utilize the data from the data lake 102 to provide product recommendations 128 to a customer. As described in further details below, providing recommendation to a customer may increase the sale of related products and/or assist the customer in carrying out a specific task and/or goal. In some examples, the implementation layer 138 may recommend the products identified in the analytics layer 116 at different locations. For example, as described below, the implementation layer 138 may provide a customer with recommendations of related product on an eCommerce portal 148. For instance, recommendations may be made to a customer on a checkout menu, a product menu, and/or other pages on an eCommerce portal 148. In addition, recommendations may be made when a customer calls a call center 162, through an email campaign 160 sent to the customer, and/or through an offline campaign 164 (e.g., in a store as a customer checks out).

Figure 2:
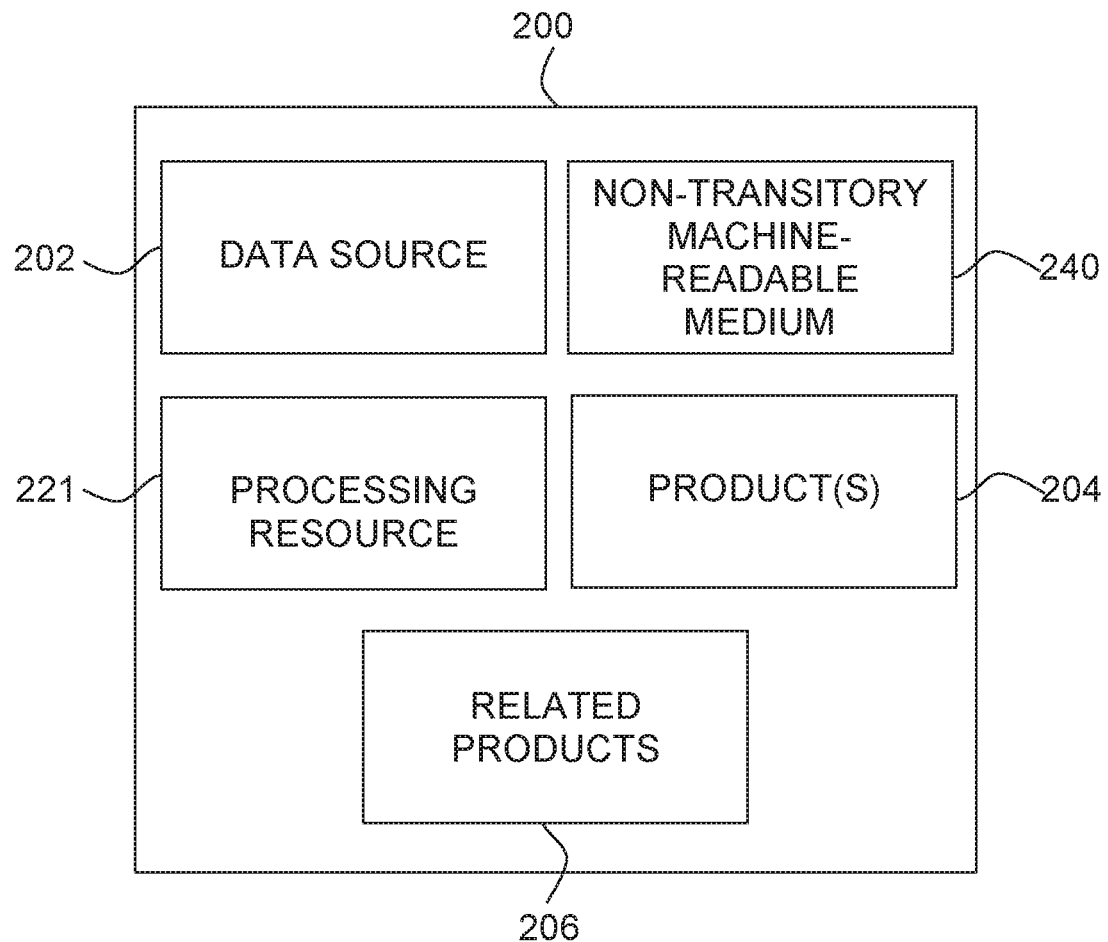
FIG. 2 illustrates an example of a system consistent with the disclosure.

FIG. 2 illustrates an example of a system 200 consistent with the disclosure. System 200 is analogous or similar to system 100 of FIG. 1. Data lake 202 is analogous or similar to data lake 102 of FIG. 1. In some examples, the system 200 may include a non-transitory machine-readable medium 240 storing instructions executable by a processing resource 221. The non-transitory machine-readable medium 240 may cause the processing resource 221 to rank related products 206 to recommend to a customer. For example, the data lake 202 may provide the analytics layer (e.g., optimization and predictive analytics layer 116 of FIG. 1) with products that the customer is interested in. The optimization and predictive analytics layer 116 may then use the data provided by the data lake 202 to rank related products 203 for recommendation. As used herein, "related products" refers to a product or products that is/are interdependent to a product stored in the data lake and/or a product or products that is/are deemed useful to a customer.

In some examples, the optimization and predictive analytics layer 116 may use revenue coverage optimization to rank the products. The revenue coverage optimization based ranking is based on at least two factors. The first factor the revenue coverage optimization based ranking is based on is a product's individual contribution to revenue, volume, and/or margin. The second factor the revenue coverage optimization based ranking is based on is a product's ability to enable the sale of other products in the product portfolio. Using the revenue coverage optimization to rank products may maximize the cumulative revenue of customer orders.

In some examples, related products 206 may be ranked to determine the products that are most useful to the customer. For example, the characteristics and/or intended purpose of the interest products 204 the customer is interested in is taken into account when ranking related products 206. The top ranking related products 206 may then be recommended to the customer by the implementation layer (e.g., implementation layer 138 of FIG. 1). In addition, the optimization and predictive analytics layer may determine how the interest product 204 enables the sale of other related products 206. That is, the non-transitory machine-readable medium 240 may cause the processing resource 221 to determine related products 206 that may be used in conjunction with the products 204.

Determining related products 206 that may be used with the interest products 204 may increase the sale of related products 206. In addition, determining related products 206 that may be used with the interest products 204 may assist the customer in carrying out a specific task and/or goal. For instance, storing interest products 204 from both an online store and a physical store in a data lake 202 may allow the analytics layer to better understand the specific task and/or goal of the customer. For instance, non-transitory machine-readable medium 240 may cause the processing resource to recommend related products 206 that are specific to the goals of the customer based on interest products 204 associated with the data lake 202 of a customer from an online store and a physical store.

In some examples, the system 200 may analyze the interdependence of an interest product 204 in relation to related products 206. For example, if a customer purchases an interest product 204, in an online store or a physical store, the non-transitory machine-readable medium 240 may cause the processing resource 221 to determine related products 206 that may be used in conjunction with the interest product 204. As used herein, "interdependence" refers to two or more products depending on each other to accomplish a task and/or two or more products that may be used in conjunction with each other. The system 200 may then recommend the related products 206 to the customer.

In some examples, the system 200 may rank related products 206 based on how often a related product 206 is purchased with the interest product 204. For examples, the system 200 may compare the interest products 204 of a customer, bought and/or viewed in a physical store and in an online store, with similar purchases of other customers, bought in a physical store and in an online store. The system 200 may then determine based on the purchases of the other customers, related products 206 to the interest product 204 of a customer. The related products 206 may be ranked based on the usefulness to the interest product 204 of the customer and then the system 200 may recommend the top related products 206 to the customer. That is, the system 200 may determine interest products 204 of the customer that are similar to products purchased by other customers and then recommend related products 206 purchased by the other customers to the customer. The system 200 may recommend related products 206 to the customer based on the compared purchases of other customers and the ranking of related products 206.

As used herein, "similar purchase" refers to the purchase of a substantially similar product by a customer compared to another customer. As used herein, the term substantially intends that the characteristic does not have to be absolute but is close enough so as to achieve the characteristic. That is, "substantially similar" is not limited to absolutely similar. For example, substantially similar products may include products that are intended to provide the same function. For instance, substantially similar products may be a router from a first brand purchased by the customer and a router from a second brand purchased by another customer, a 3.5 GHz central processing unit purchased by a customer and a 4.7 GHz central processing unit purchased by another customer, etc. In some examples, substantially similar products may be the same exact product.

Figure 3:
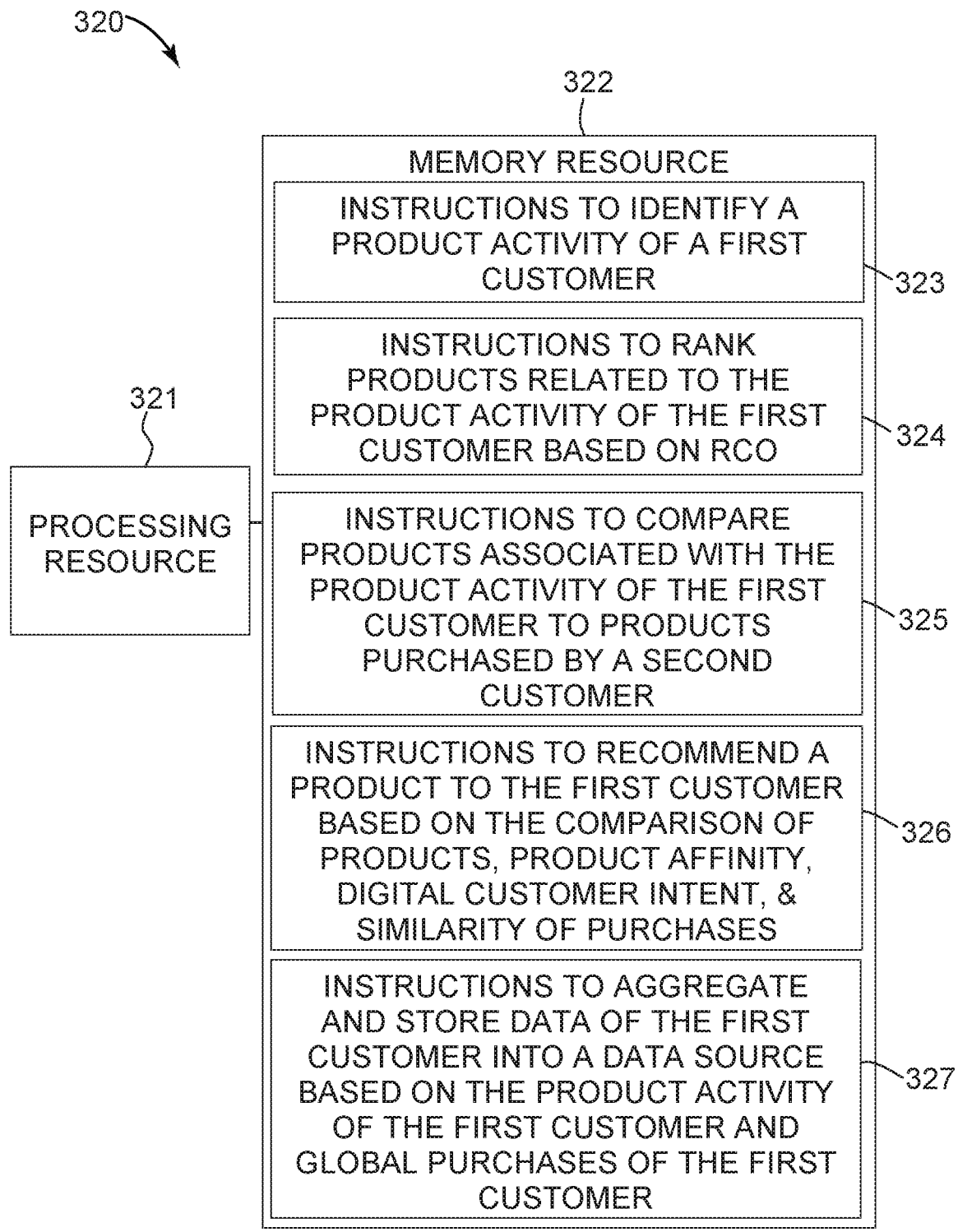
FIG. 3 illustrates an example of an apparatus suitable with a system consistent with the disclosure.

FIG. 3 illustrates an example of an apparatus 320 suitable with a system consistent with the disclosure. As illustrated in FIG. 3, the apparatus 320 includes a processing resource 321 and a memory resource 322. The processing resource 321 may be a hardware processing unit such as a microprocessor, application specific instruction set processor, coprocessor, network processor, or similar hardware circuitry that may cause machine-readable instructions to be executed. In some examples, the processing resource 321 may be a plurality of hardware processing units that may cause machine-readable instructions to be executed. The processing resource 321 may include central processing units (CPUs) among other types of processing units. The processing resource 321 may also include dedicated circuits and/or state machines, such as in an Application Specific Integrated Circuit (ASIC), Field Programmable Gate Array (FPGA) or similar design-specific hardware. The memory resource 322 may be any type of volatile or non-volatile memory or storage, such as random-access memory (RAM), flash memory, read-only memory (ROM), storage volumes, a hard disk, or a combination thereof.

The memory resource 322 may store instructions thereon, such as instructions 323, 324, 325, 326 and 327. When executed by the processing resource 321, the instructions may cause the apparatus 320 to perform specific tasks and/or functions. For example, the memory resource 322 may store instructions 323 which may be executed by the processing resource 321 to cause the apparatus 320 to identify a product activity of a first customer. In some examples, the system may identify the product interactions of a customer and store the interactions in the data lake.

The memory resource 322 may store instructions 324 which may be executed by the processing resource 321 to cause the apparatus 320 to rank products related to the product activity of the first customer based on revenue coverage optimization. In some examples, a data lake may store an interest product of a first customer. The apparatus 320 may then review the interest products stored in the data lake and create a list of products that are related to the interest products stored in the data lake. In some examples, after the apparatus 320 may generate a list of related products. The list may then be ranked based on which related products are interdependent with the interest products in the data lake, which related products will assist the first customer in completing a task when combined with the interest products stored in the data lake, which related product is a first customer most likely to purchase, or a combination thereof. In some examples, the list may be ranked based on the product's ability to enable the sale of other products in the product portfolio and the product's individual contribution to revenue, volume, and/or margin.

The top ranked products may then be recommended to the first customer. For instance, the apparatus 320 may recommend the top ranked related products to the first customer in the checkout menu, in the product menu, through an email. That is, the apparatus may use features (e.g., eCommerce portal 148, call center 162, email campaign 160, and/or offline campaign 164 of FIG. 1) of the implementation layer (implementation layer 138 of FIG. 1) to recommend related products to the first customer.

The memory resource 322 may store instructions 325 which may be executed by the processing resource 321 to cause the apparatus 320 to compare products associated with the product activity of the first customer to products purchased by a second customer. In some examples, a second customer may purchase a product to accomplish a particular goal and/or task. The second customer may also purchase additional products related to the product. The additional/related products may assist the second customer in accomplishing the goal and/or task. If a first customer purchases a substantially similar product as the second customer, the apparatus 320 may compare the two products and conclude that the first customer may have a substantially similar goal and/or task as the second customer. The apparatus 320 may then recommend the same additional/related products relating to the product purchased by the second customer to the first customer. Recommending the same additional/related products may assist the first customer in accomplishing their goal and/or task. That is, the apparatus 320 may compare the goal and/or task of the first customer and a second customer to determine which related products should be recommended to the first customer.

In some examples, the apparatus 320 may compare products purchased in the same quarter time period or in different time periods. For examples, the apparatus 320 may compare a product purchased by the second customer in a first quarter of a year with a product stored in the data lake of the first customer in a second quarter of a year.

The memory resource 322 may store instructions 326 which may be executed by the processing resource 321 to cause the apparatus 320 to recommend related at least one product to the first customer from a product portfolio offering based on the comparison of products, affinity of products, similarity of customers purchasing the products, and digital customer intent, wherein the product portfolio offering comprises a plurality of products having interdependencies. In some examples, the products purchased by a second customer may inform the apparatus 320 which related products to recommend to a first customer. For example, if the first customer and the second customer are determined to be a substantially similar customer type and are purchasing products to accomplish the substantially similar goal and/or task, the products viewed and/or purchased by the second customer may assist in accomplishing the goal and/or task of the first customer. As such, the apparatus 320 may recommend related products purchased by a second customer and not the first customer. Recommending related products purchased by a second customer and not the first customer may assist the first customer with accomplishing their goal and/or task and may increase the sale of products.

The memory resource 322 may store instructions 327 which may be executed by the processing resource 321 to cause the apparatus 320 to aggregate and store data of the first customer into a data lake based on the product activity of the first customer and global purchases of the first customer. In some examples, a data lake may contain all information related to purchases made by first customer. As described below, the data lake may store information on product activity made in a local branch and/or a company headquarter. That is, the data lake may store all product activity made by a first customer to provide useful and up-to-date product recommendations to the first customer. Aggregating all product activity in one location may allow the apparatus 320 to make current recommendations based on the first customer's goals.

The data lake may also store data about products the first customer is interested in. For example, if the first customer likes a product the data lake may store the data and the apparatus 320 may use the data to make related product recommendations. For instance, if a first customer views a product multiple times but does not purchase the product the apparatus 320 may determine that the first customer likes the product or is interested in the product. The apparatus 320 may then use the data to make related product recommendations. If the first customer saves a product to purchase later the data lake may store the data and the apparatus 320 may also use the data to make related product recommendations.

Figure 4:
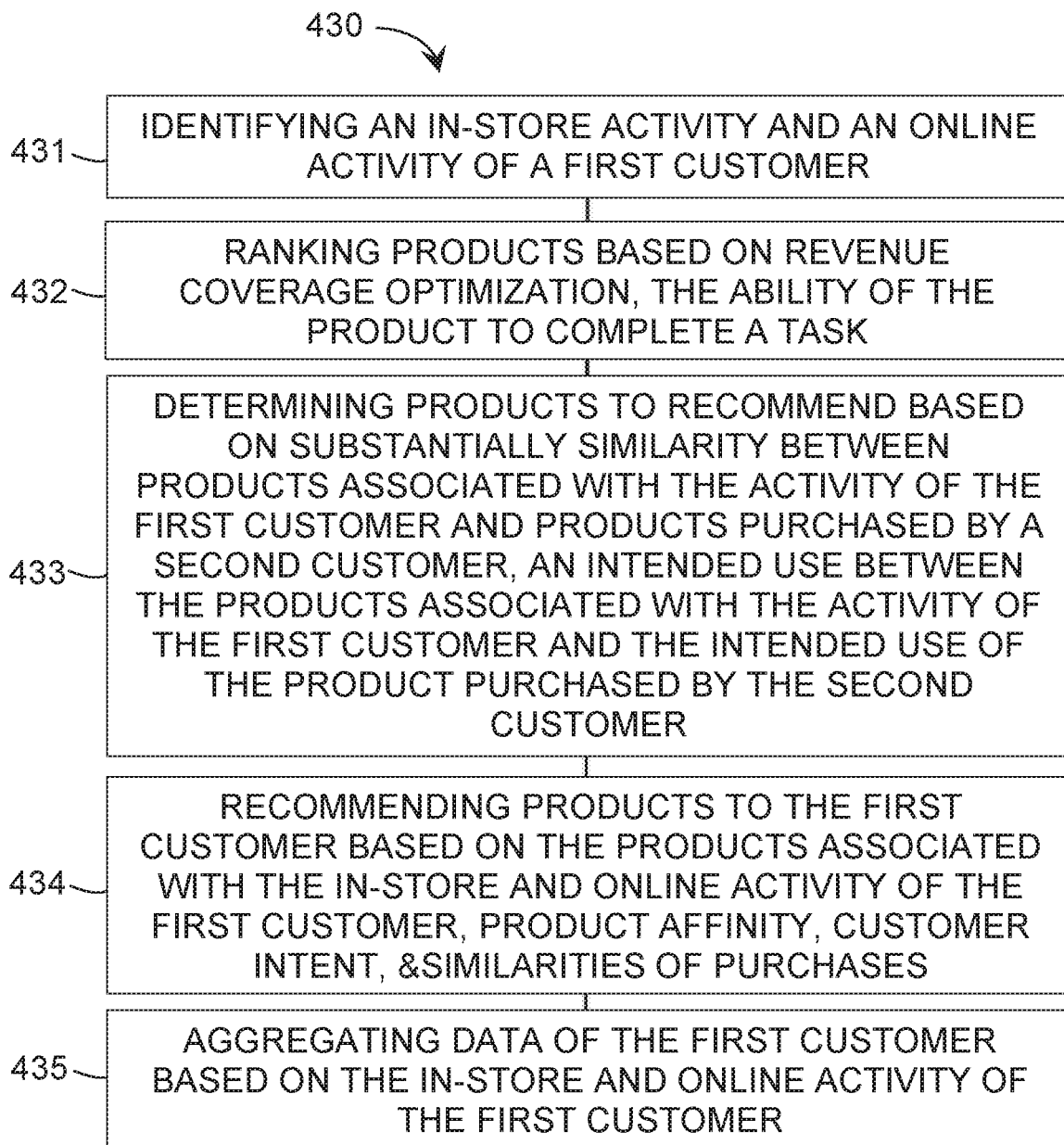
FIG. 4 illustrates an example of a method consistent with the disclosure.

FIG. 4 illustrates an example of a method 430 consistent with the disclosure. Method 430 may be performed, for example, by a processing resource (e.g., processing resource 221 of FIG. 2) of a system (e.g., system 200 of FIG. 2). In some examples, the method 430 may be performed with more or less elements.

At 431, the method 430 may include identifying the in-store activity and the online activity of a first customer. In some examples, the in-store activity and online activity of the first customer may be stored in the data lake. In addition, the in-store activity and online activity of the first customer may be compared to other products to make recommendation to the first customer.

At 432, the method 430 may include ranking products based on revenue coverage optimization (RCO), the ability of the product to complete a task of the first customer, or a combination thereof. In some examples, the system may determine the similarities between products to determine the product affinity between the products. As used herein, "product affinity" refers to the similarity of the characteristics and function of a product with another product. In some examples, the system may use the similarities between the products stored in the data lake of the first customer and the products purchased by a second customer to determine related products to recommend to the first customer. The system may then rank the related products to determine which products to recommend to the first customer.

In some examples, the system may determine which customers are substantially similar. That is, the system may determine if a first customer and a second customer are categorized as a substantially similar customer type. As used herein, "customer type" refers to similarities between the interests and/or business attributes of a customer with another customer. For example, customers may be a substantially similar customer type if the customers share similar attributes. For instance, customers may share similar attributes if the customers have over 10,000 employees, if the customers are in the same industry (e.g., oil & gas, etc.), etc.

In some examples, customers that are categorized as substantially similar customer type may purchase substantially similar products. As such, the system may recommend the products purchased by the second customer to the first customer when it is determined that the first customer and the second customer have substantially similar customer intent. In some examples, the system may rank the related products before recommending the related products to the first customer. As used herein, "customer intent" refers to similarities between the goal and/or purpose of a customer with the goal and/or purpose of another customer. In some examples, the customer intent may be based on online activity which may show the digital customer intent. In some examples, the customer intent may be based on in-store activity or a combination of both online and in-store activity.

In some examples, the system may determine which related products will assist the first customer in completing their goal based on the goals of a second customer with a substantially similar intent. The system may determine if there is a substantial similar customer intent based on products purchased by the second customer and interest products of the first customer. The related products may then be ranked and the most useful related products may be recommended to the first customer.

In some examples, the related products may be ranked based on the ability of a related product to assist the first customer with their goal and the ability of the related product to sale other products. That is, the interest product of the first customer may assist in the sale of related products because the related products may assist in accomplishing the goals of the first customer Ranking related products on the ability to sale other products may increase the sale of products in physical stores and in online stores. For instance, when a related product is recommended to the first customer because it may help the first customer complete a task, the first customer is likely to purchase the product.

At 433, the method 430 may include determining products to recommend based on substantially similarity between products associated with the in-store and online activity of the first customer and products purchased by a second customer, an intended use between the interest products associated with the in-store and online activity of the first customer and the intended use of the product purchased by the second customer, or a combination thereof. In some examples, if a first customer and a second customer purchase a substantially similar product, other related products purchased by the second customer may be recommended to the first customer.

The method 430 may compare the products in the customer cart of the first customer with the products purchased by the second customer in order to recommend related products to the first customer. That is, the method 430 may determine related products to recommend based the compared products in the customer cart of the first customer and the products purchased by the second customer.

At 434, the method 430 may include recommending products from the product portfolio offering to the first customer based on the products associated with the in-store and online activity of the first customer. In some examples, the products purchased in a physical store and an online store by a first customer may be compared to products purchased by other customers. The comparison may allow the processing resource to recommend products purchased by the other customers to the first customer.

At 435, the method 430 may include aggregating data of the first customer based on the in-store and online activity of the first customer. In some examples, aggregating all account activity to one location may allow the processing resource to make recommendations based on the first customer's goals. As such, a data lake may contain all information related to purchases and/or activity of a first customer. For example, the data lake may store data about purchases/activity in a physical store, purchases/activity made in an online store, purchases/activities made in a local market and/or a global market, etc.

In some examples, the purchases and activity of a first customer may provide information on the technological demands of a first customer. As such, aggregating the digital footprint at three levels may assist in making recommendations to the first customer based on their technological demands. That is, aggregating the digital footprint of the first customer may include aggregating product activity associated with the first customer's user ID or email address, aggregating product activity associated with the first customer's organization ID or country account ID, and aggregating product activity associated with the first customer's root organization ID or global account ID. As used herein, "digital footprint" refers to product activity of a customer, including both in-store activity and online activity.

In some examples, the data lake of a first customer may store the online activity and in-store activity (e.g., purchases) made by a user ID or email address and carried out by a company contact person (e.g., an employee). In addition, the data lake of a first customer may store the online activity and in-store activity made by an organization ID or country account ID and carried out by a company branch. Further, the data lake of a first customer may store the online activity and in-store activity made by a root organization ID or global account ID and carried out by a company headquarter (e.g., corporation headquarter). In some examples, the system may utilize a first customer's activity from a user ID, organizational ID, and/or root organizational ID to recommend related products to the customer. That is, the system may be able to aggregate activity at different levels to determine recommendations for the first customer.

Figure 5:
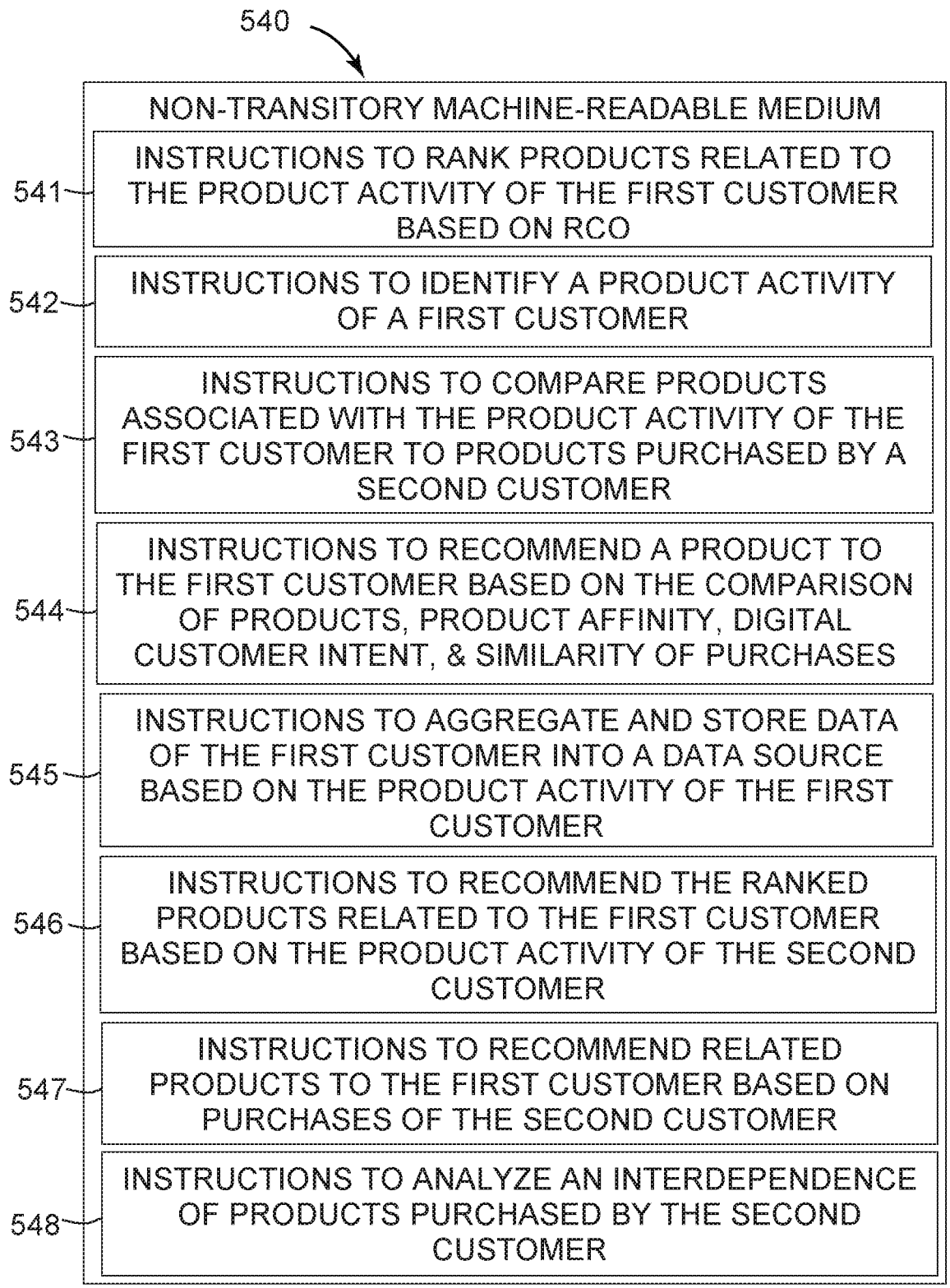
FIG. 5 illustrates an example diagram of a non-transitory machine readable medium suitable with a system consistent with the disclosure.

FIG. 5 illustrates an example diagram of a non-transitory machine readable medium 540 suitable with a system consistent with the disclosure. The non-transitory machine-readable medium 540 may be any type of volatile or non-volatile memory or storage, such as random-access memory (RAM), flash memory, read-only memory (ROM), storage volumes, a hard disk, or a combination thereof.

The medium 540 stores instructions 541 executable by a processing resource to rank products related to the product activity of the first customer based on revenue coverage optimization (RCO). In some examples, the medium 540 may determine which products are related to products stored in the data lake of a first customer. The medium 540 may then rank the related products to determine which related products to recommend to the first customer. The medium 540 may rank the related products based on which product the first customer is most likely to buy, which product would allow the first customer to accomplish their goal and/or task, amongst other possibilities. In some examples, the medium 540 may recommend the top five related products of the ranked products to the first customer. However, this disclosure is not so limited. For example, the medium 540 may recommend the top two related products or as many related products that may assist the first customer in accomplishing their goal.

The medium 540 stores instructions 542 executable by a processing resource to identify a product activity of a first customer. The medium 540 stores instructions 543 executable by a processing resource to compare products associated with the product activity of the first customer to products purchased by a second customer. In some examples, the medium 540 may recommend products purchased by a second customer to a first customer. That is, the medium may compare interest products of a first customer to products purchased and/or viewed by a second customer to make recommendations to the first customer. In some examples, comparing and then recommending products may assist the first customer in completing a specific task and may also increase the sale of products.

The medium 540 stores instructions 544 executable by a processing resource to recommend products to the first customer from a product portfolio offering based on the comparison of products, affinity of products, similarity of customers purchasing the products, and digital customer intent. In some examples, the medium 540 may recommend products to the first customer after comparing substantially similar products purchased by multiple customers. For example, if multiple customers purchased the same additional products after purchasing a particular product the medium 540 may determine that the additional products are related to the purchased product and may recommend the additional products to the first customer. That is, the medium 540 may determine that the purchased product and the additional products are interdependent. In some examples, comparing substantially similar products purchased by multiple customers may determine if the customers have substantially similar goals and/or tasks.

The medium 540 stores instructions 545 executable by a processing resource to aggregate and store data of the first customer into a data lake based on the product activity of the first customer and global purchases of the first customer. A data lake may contain all information related to products a first customer is interested in. For example, the data lake may store all product activity made by a first customer. For instance, the data lake may store each time a first customer views a product, saves a product, purchases a product in a physical store, purchases a product in an online store, etc. In addition, the data lake may store activity made locally at a company branch and/or globally at the company headquarters. Aggregating all activity of a first customer in one location may allow the medium 540 to make recommendations based on the first customer's goals.

The medium 540 stores instructions 546 executable by a processing resource to recommend the ranked products related to the first customer based on the product activity of the second customer. In some examples, the medium 540 may rank product related to the first customers earlier purchases. For example, the first customer may have purchased a product one year ago, for example, and the medium 540 may recommend a substantially similar product and/or an updated version. The medium 540 may then rank the products to determine which product the first customer is most likely to buy and then recommend the product to the first customer.

The medium 540 stores instructions 547 executable by a processing resource to recommend related products to the first customer based on online purchases of the second customer and in-store purchases of the second customer. In some examples, if the first customer and the second customer purchase substantially similar products the additional products purchased by the second customer may be useful to the first customer. The medium 540 may then recommend the additional products purchased by a second customer and not the first customer to the first customer.

The medium 540 stores instructions 548 executable by a processing resource to analyze an interdependence of products purchased by the second customer. In some examples, the medium 540 may determine if a product and additional products purchased by the second customer are interdependent. The medium 540 may analyze how often the additional products were purchased with the product when other customers purchased the product. If it is determined that the product and additional products are interdependent then the medium 540 may recommend the additional products to the first customer. In some examples, analyzing the interdependence between products may allow the for the product portfolio to be reduced. For example, if it is determined that a product is not useful and/or interdependent the system may determine that the product is to be removed from the product portfolio.

Figure 6:
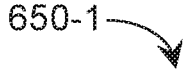
FIG. 6 illustrates an example of charts consistent with the disclosure.
Figure 6:
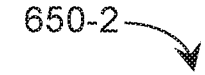

FIG. 6 illustrates an example of charts 650-1 and 650-2 consistent with the disclosure. Chart 650-1 represents customer likes and dislikes of products without a prediction. Chart 650-2 represents customer likes and dislikes of products with a prediction. In some examples, a system (e.g., system 200 of FIG. 2) may cause the processing resource (e.g., processing resource 221 of FIG. 2) to recommend products to a first customer 651 based on similarities with other customers (e.g., second customer 652, third customer 653, and/or fourth customer 654). First customer 651, second customer 652, third customer 653, and fourth customer 654 collectively refer to first customer 651-1, second customer 652-1, third customer 653-1, and fourth customer 654-1 of chart 650-1 and first customer 651-2, second customer 652-2, third customer 653-2, and fourth customer 654-2 of chart 650-2, respectively. That is, the system may predict which products a first customer 651 will like based on the similarities between the first customer 651 and other customers. For instance, the system may determine if the first customer 651 is a substantially similar customer type as the other customers.

In some examples, the system may compare the likes and dislikes of a first customer 651 to the likes and dislikes of other customers. That is, the system may determine if a first customer likes a product (e.g., fourth product 658-1) which is currently not part of the data lake of the first customer 651-1 but have been purchased by other customers that have similar interest. That is, the system may determine if customers (e.g., first customer 651, fourth customer 654) are similar based on the purchasing and/or interest of substantially similar products by the customers. If the number of products the customers like and dislike exceeds a threshold it may be determined that the customers are similar. If it is determined that the customers are similar, the system may recommend products purchased by one customer and not the other. In contrast, if it is determined that the customers are not similar the system may not recommend products purchased by one customer and not the other.

For example, the system may compare the product likes and dislikes of the first customer 651 and the fourth customer 654 and determine if two customers are similar. Here, based on the data lakes of the first customer 651 and the fourth customer 654 it is known that both the first customer 651 and the fourth customer 654 like the first product 655 and the second product 656. However, it is not known if the fourth customer 654 dislikes the third product 657 as the first customer 651 does. In addition, it is not known if the first customer 651 likes the fourth product 658 as the fourth customer 654 does. Therefore, the system may determine that there are not enough similarities between the first customer 651 and the fourth customer 654 to make a proper prediction and/or determination of the first customer's likes and dislikes. First product 655, second product 656, third product 657, and fourth product 658 collectively refer to first product 655-1, second product 656-1, third product 657-1, and fourth product 658-1 of chart 650-1 and first product 655-2, second product 656-2, third product 657-2, and fourth product 658-2 of chart 650-2, respectively.

In addition, the system may compare the product likes and dislikes of the first customer 651 and the third customer 653 to determine if the two customers are similar. Here, based on the data lakes of the first customer 651 and the third customer 653 do not have similar likes and dislike in regard to the second product 656 and the third product 657. Further, it is not known if the third customer 653 likes the first product 655 as the first customer 651 does. In addition, it is not known if either the first customer 651 or the third customer 653 likes or dislikes the fourth product 658. Therefore, the system may determine that the first customer 651 and the third customer 653 are not similar.

Likewise, the system may compare the product likes and dislikes of the first customer 651 and the second customer 652 to determine if the two customers are similar. Here, based on the data lakes of the first customer 651 and the second customer 652 it is known that the first customer 651 and the second customer 652 both like the first product 655 and the second product 656 and both dislike the third product 657. However, it is unknown if the first customer 651 likes the fourth product 658 as the second customer 652 does. Therefore, the system may determine that the first customer 651 and the second customer 652 are similar since both customers like and dislike the same products (e.g., the first product 655, second product 656, and third product 657) and the number of products that the first customer 651 and the second customer 652 like and/or dislike exceeds a threshold. As such, the system may predict (represented by the underlined check mark) that the first customer 652-2 likes the fourth product 658-2. In addition, the system may determine that the first customer 651 would likely purchase the fourth product 658. Based on the prediction the system may recommend the fourth product 658 to the first customer 651.

Figure 7:
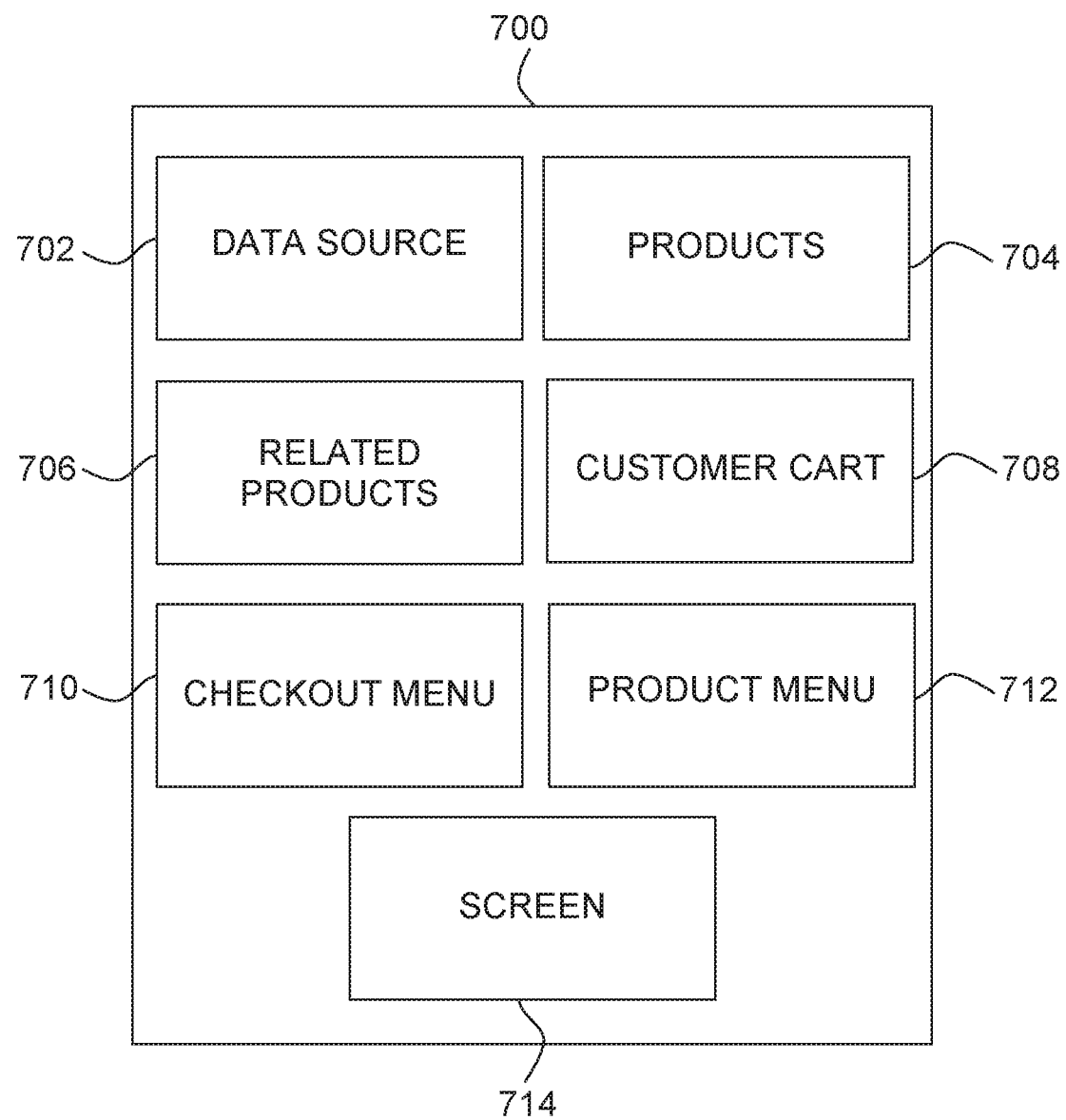
FIG. 7 illustrates an example of a system consistent with the disclosure.

FIG. 7 illustrates an example of a system 700 consistent with the disclosure. In some examples, the system 700 may include a data lake 702. Data lake 702 is analogous or similar to data lake 102 and 202 of FIGS. 1 and 2, respectively. Product 704 is analogous or similar to product 204 of FIG. 2. Related product 706 is analogous or similar to related product 206 of FIG. 2. System 700 is analogous or similar to system 100 and 200 of FIGS. 1 and 2, respectively.

In some examples, the system 700 may also include a non-transitory machine-readable medium (e.g., non-transitory machine-readable medium 240 of FIG. 2) storing instructions executable by a processing resource (e.g., processing resource 221 of FIG. 2). The non-transitory machine-readable medium may cause the processing resource to predict which related products 706 a customer is likely to purchase based similar likes and dislikes of other customers. In some examples, if it is determined that a customer would like a related product, the processing resource may recommend the related product to the customer. That is, the system 700 may determine which products the customer is likely to purchase based on the product activity of the customer stored in the data lake 702 and the product activity of other customers.

In some examples, the system 700 may determine which products are purchased together and determine if the customer has purchased and/or viewed one of the products that are purchased together. In some examples, the system 700 may determine which related products 706 are useful to the customer and recommend the related product 706 to the customer based on the interest product 704 of the customer.

In some examples, a customer may view interest products 704 on a product menu and save the interest products 704 to a customer cart 708 to purchase at a later time. The interest products 704 saved in the customer cart 708 may be stored in the data lake 702 of the customer. In some examples, the system 700 may rank products related to the interest products 704 in the customer cart 708 to determine which related products 706 to recommend to the customer. In some examples, the system 700 may compare the interest products 704 to products purchased and/or liked by other customers to determine which related products 706 to recommend to the customer. That is, if a customer views and/or saves an interest product 704 to the customer cart 708 the system 700 may determine related products 706 that may be used in conjunction with the viewed and/or saved products 704. The system 700 may then recommend the related products 706 to the customer. As used herein, "customer cart" refers to a place in the online store where products are saved.

Products may be recommended to a customer in a variety of different ways. For example, the product recommendations may be made on a home page of an online store, a checkout menu 710, a product menu 712, screen 714, etc. In addition, the product recommendations may be made at an in-store register. For example, as a customer is checking out at the register a computer screen 714 may recommend products to the customer. That is, the system 700 is able to target and make recommendations to a customer in a physical store and an online store based on the data lake 702.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

It should be understood that the descriptions of various examples may not be drawn to scale and thus, the descriptions may have a different size and/or configuration other than as shown therein.

What is claimed:

1. A non-transitory machine-readable medium storing instructions executable by a processing resource to:
    obtain, from a digital products data store, a product portfolio offering of products offered for purchase;
    identify a first product activity of a first customer from a first data store, the first product activity identifying a first set of products of the product portfolio offering in which the first customer has expressed interest, wherein the first product activity includes at least an in-store activity of the first customer;
    analyze interdependence between products of a second set of products of the product portfolio offering purchased by a second customer, the second set of products identified from a second data store, wherein interdependence comprises a dependence between two or more products to accomplish a task;
    compare the first set of products associated with the first product activity of the first customer to the second set of products;
    generate an optimized product portfolio offering for the first customer by predicting a set of related products from the product portfolio offering based on application of a predictive analytics layer to the first set of products, the second set of products, and the product portfolio offering, wherein the set of related products is based on similarity between the first set of products and the second set of products and interdependence between each of the first set of products and each of the second set of products, wherein a number of products in the optimized product portfolio offering is less than a number of products in the product portfolio offering;
    rank each product of the set of related products in the optimized product portfolio offering based on the product's ability to enable sale of one or more other products of the optimized product portfolio offering and an ability of the product to complete a task of the first customer;
    based on the rank of each product of the set of related products, generate a reduced number of display products to display to the first customer from the optimized product portfolio offering to a recommended subset of the set of related products in order to cause a product menu to load the recommended subset of the set of related products faster than reducing the number of display products to display to the first customer from the product portfolio offering;
    display the recommended subset of the set of related products to the first customer in the product menu based on the comparison of the first set of products and the second set of products, an affinity of the first set of products and the second set of products, a similarity of the first customer and the second customer purchasing the first set of products and the second set of products, respectively, and a digital customer intent, wherein the product portfolio offering comprises a plurality of products having interdependencies; and
    aggregate and store data of the first customer into a data lake based on the first product activity of the first customer and global purchases of the first customer.

2. The non-transitory machine-readable medium of claim 1, further including instructions to recommend the set of related products to the first customer based on the second product activity of the second customer.

3. The non-transitory machine-readable medium of claim 1, further including instructions to recommend the set of related products to the first customer based on online purchases of the second customer and in-store purchases of the second customer.

4. The non-transitory machine-readable medium of claim 1, further including instructions to recommend one or more of the second set of products purchased by the second customer determined to be interdependent to products associated with the first product activity of the first customer.

5. The non-transitory machine-readable medium of claim 1, wherein products are recommended based on similarities between an intended use of the products associated with the product activity of the first customer and the intended use of the products purchased by the second customer.

6. The non-transitory machine-readable medium of claim 1, wherein the products are recommended to the first customer on an online menu, at an in-store register, at an eCommerce portal, through a call center, through an email campaign, on an offline campaign, or a combination thereof.

7. A method comprising:
    obtaining a product portfolio offering of products offered for purchase;
    identifying an in-store activity and an online activity of a first customer, the in-store and online activity identifying a first set of products of the product portfolio offering in which the first customer has expressed interest;
    analyzing interdependence between products of a second set of products of the product portfolio offering purchased by a second customer, the second set of products identified from a second data store, wherein interdependence comprises a dependence between two or more products to accomplish a task;

comparing the first set of products to the second set of products;

generating an optimized product portfolio offering for the first customer by determining products to recommend from the product portfolio offering based on application of a predictive analytics layer to: the first set of products and the second set of products purchased by a second customer and an intended use of the first set of products and an intended use of the second set of products purchased by the second customer, wherein the products in the optimized product portfolio offering are based on similarity between the first set of products and the second set of products and interdependence between each of the first set of products and each of the second set of products, wherein a number of products in the optimized product portfolio offering is less than a number of products in the product portfolio offering;

ranking each product of the optimized product portfolio offering based on the product's ability to enable sale of one or more other products of the product portfolio offering and an ability of the product to complete a task of the first customer;

based on the rank of each product of the determined products in the optimized product portfolio offering, generating a reduced number of display products to display to the first customer from the optimized product portfolio offering to a recommended subset of the determined products of the optimized product portfolio offering in order to cause a product menu to load the recommended subset of the set of determined products of the optimized product portfolio offering faster than reducing the number of display products to display to the first customer from the product portfolio offering;

loading the product menu and displaying the recommended subset of the determined products to the first customer in the product menu based on the first set of products, an affinity of the first set of products and the second set of products, a similarity of the first customer and the second customer purchasing the first set of products and the second set of products, a digital customer intent, or a combination thereof; and aggregating data of the first customer based on the in-store and online activity of the first customer.

8. The method of claim 7, further comprising comparing the first set of products with the second set of products purchased by the second customer.

9. The method of claim 8, wherein the recommendation of at least one product of the determined products is further based on the comparison of the first set of products associated with the in-store and online activity of the first customer and the second set of products purchased by the second customer.

10. The method of claim 7, further comprising recommending a first five products of the determined products once ranked.

11. The method of claim 7, further comprising aggregating and storing data of the first customer into a data lake.

12. The non-transitory machine-readable medium of claim 1, wherein the recommended subset of the set of related products is based on a similarity between a customer type of the first customer and a customer type of the second customer.

13. The non-transitory machine-readable medium of claim 1, wherein the ranking of each product of the set of related products is responsive to an indication of at least one product that the first customer expressed a current interest in and is based on an ability of each product of the set of related products to complete a task similar to the at least one product.

* * * * *